United States Patent

Yoshikawa

[11] Patent Number: 6,034,767
[45] Date of Patent: Mar. 7, 2000

[54] MONOCHROMATOR AND OPTICAL ANALYZING DEVICE USING THE SAME

[75] Inventor: Osamu Yoshikawa, Nara, Japan

[73] Assignee: Shimadzu Corporation, Kyoto, Japan

[21] Appl. No.: 09/292,023

[22] Filed: Apr. 15, 1999

[30] Foreign Application Priority Data

Apr. 17, 1998 [JP] Japan .................................. 10-124167

[51] Int. Cl.$^7$ .................................. G01J 3/18; G01J 3/42
[52] U.S. Cl. .......................... 356/308; 356/328; 356/334
[58] Field of Search .................................. 356/308, 326, 356/328, 332, 334

[56] References Cited

U.S. PATENT DOCUMENTS

| | | | |
|---|---|---|---|
| 4,732,476 | 3/1988 | Barshad | 356/308 |
| 4,969,739 | 11/1990 | McGee | 356/308 |

*Primary Examiner*—F.L. Evans
*Attorney, Agent, or Firm*—Armstrong, Westerman, Hattori, McLeland & Naughton

[57] ABSTRACT

A monochromator according to the present invention has an arm 1 rotatably mounted on a rotation shaft 3, and a diffraction grating 6 is fixed to the arm 1. The arm 1 is rotated by a linear motor 9 including a moving part 91 fixed to the arm 1 and a stator part 92 fixed to a base 2. The linear motor 9 is a voice-coil linear motor constructed to allow the arm 1 to rotate reciprocatively around the rotation shaft 3 within a preset angular range. The absolute rotational position of the arm 1 is detected by a rotary encoder 7 including a crossbar 71 fixed to the arm 1 and a encoder block 72 fixed to the base 2. Based on the output signal of the rotary encoder 7, the linear motor 9 is controlled so that the moving part 92 rotates at a fixed angular speed around the rotation axis 3. Thus, the wavelength scanning is carried out at high speed, and sampling of monochromatic light having desired wavelengths is performed accurately.

11 Claims, 2 Drawing Sheets

MONOCHROMATOR AND OPTICAL ANALYZING DEVICE USING THE SAME

The present invention relates to a monochromator used in a spectrophotometer or other optical analyzing device.

BACKGROUND OF THE INVENTION

A spectrophotometer includes a monochromator for obtaining monochromatic light of a preset or desired wavelength. The monochromator generally includes a light-dispersing element, such as a diffraction grating, and a driving mechanism for rotating the light-dispersing element. When the driving mechanism rotates the light-dispersing element, the orientation of the light-dispersing element with respect to the incident path changes, whereby wavelengths within a preset range are scanned. The wavelength range to be scanned is determined variously based on the purpose of the analysis, the type of spectrophotometer, and other factors. For example, the wavelength scanning range is preset at 190–1100 nm for an analysis of visible and ultraviolet light, and 700–1500 nm or 1000–2500 nm for an analysis of near infrared light. The angular range of rotation of the light-dispersing element, on the other hand, is preset at about 20–30 degrees, irrespective of the wavelength range.

Several types of mechanisms are used for rotating the light-dispersing element. One type includes a sine bar for converting a linear movement to a rotary movement, and another type uses an open loop control of a step motor and reduction gears. A third type using a closed loop control of a DC servomotor is also known.

With the first and second types of mechanisms, however, one cycle of the wavelength scanning takes a long time, often several tens of seconds. Another drawback of these two mechanisms that is known relates to wavelength discrepancy. For example, in all spectrophotometers, when the relation between the controlling inputs of the driving mechanism and the rotation angles produced thereby changes as a result of degeneration after a lapse of long time, a discrepancy arises between the wavelength desired by the user and the wavelength of the monochromatic light actually obtained. With the first and second mechanisms, however, the discrepancy cannot be detected immediately because they do not have a means for determining the rotational position of the light-dispersing element.

As for the third type of the mechanism using a closed loop control of a DC servomotor, the wavelength scanning speed is very high, and there is hardly any wavelength discrepancy because the mechanism includes a means for determining the rotational position of the light-dispersing element. This type of mechanism, however, has a drawback due to the use of the DC servomotor. That is, commercially available DC servomotors are designed for producing continuous rotation, and are not suitable for fractional rotation (for example, only 20 to 30 degrees out of 360 degrees), and are particularly unsuitable for producing reciprocal movement within a preset angular range. When this type of motor is used for rotating the light-dispersing element, it is difficult to stabilize the scanning speed within a preset angular range. Therefore, when output light from the light-dispersing element is sampled at a preset time point or points within a predetermined wavelength scanning range, the accuracy and reproducibility of the wavelength corresponding to each preset time point is poor.

In light of the above-described problems, an object of the present invention is to provide a monochromator constructed so that wavelength scanning can be carried out at a high and constant speed.

SUMMARY OF THE INVENTION

Thus, the present invention proposes a monochromator which includes:
- a rotor rotatable on a rotation axis;
- a light-dispersing element fixed to the rotor, the central axis of the light-dispersing element being substantially coincident with the rotation axis;
- a linear motor having a moving part fixed to the rotor at a position displaced from the rotation axis and a stator part operative with the moving part to rotate the rotor around the rotation axis within a preset angular range;
- a position detector for detecting the rotational position of the rotor within the preset angular range; and
- a controller for controlling the linear motor based on the output signal of the position detector.

An example of the linear motor is a modified voice-coil linear motor constructed so that the moving part moves reciprocally within the preset angular range along an arc. Also, an example of the position detector is a rotary encoder.

Regarding the operation of the monochromator, the controller detects the rotational position of the rotor based on the output signal of the position detector during the wavelength scanning, and controls the driving voltage or driving current supplied to the linear motor so that the rotor moves at a fixed speed within the preset angular range. For example, the controller may instruct the linear motor to move the rotor by a preset angle for each preset time period. In general, linear motors are highly responsive to the driving voltage or driving current supplied thereto and the moving speed produced thereby is highly stable. Accordingly, when the controller controls the linear motor as described above, the rotor with the light-dispersing element fixed thereto rotates stably at a high speed within the preset angular range, maintaining a preset angular velocity. As the rotor rotates, the wavelength of monochromatic light obtained with the light-dispersing element varies continuously at a stable rate.

The above-described monochromator may be used in a spectrophotometer. In general, a spectrophotometer includes a light source for generating polychromatic light, a sample holder for holding a sample to be analyzed, a photodetector for detecting light passing through or reflected by the sample, and a data processor that samples an output singal from the photodetector. When the spectrophotometer further includes a monochromator, the sample holder is placed either between the light source and the monochromator or between the monochromator and the photodetector. In the former case, the polychromatic light passes through the sample or is reflected by the sample, and enters the monochromator. The monochromator extracts monochromatic light from the polychromatic light, and the monochromatic light is detected by the photodetector. In the latter case, the polychromatic light is first monochromated by the monochromator, and monochromatic light produced thereby passes through the sample or is reflected by the sample. After that, the monochromatic light is detected by the photodetector. In either case, the photodetector outputs detection signals to a data processor responsive to sampling signals given externally. In the spectrophotometer using the monochromator of the present invention, the data processor may preferably determine a time point at which it samples the output signal from the photodetector based on the output signals of the position detector.

As described above, the monochromator according to the present invention is constructed so that the light-dispersing element is rotated at a fixed, high speed. As a result, the time required for wavelength scanning is considerably lessened.

With the spectrophotometer having the monochromator according to the present invention, when, for example, output light from the light-dispersing element is sampled at a preset time point or points within a predetermined wavelength scanning range, the accuracy and reproducibility of the wavelength corresponding to each preset time point is high.

BRIEF DESCRIPTION OF THE DRAWINGS

FIG. 1A is a plan view and FIG. 1B is a sectional side view along line C–C' in FIG. 1A;

DETAILED DESCRIPTION OF A PREFERRED EMBODIMENT

Referring to the attached drawings, the following part of the specification describes an example of the monochromator according to the present invention.

Figure 1A:
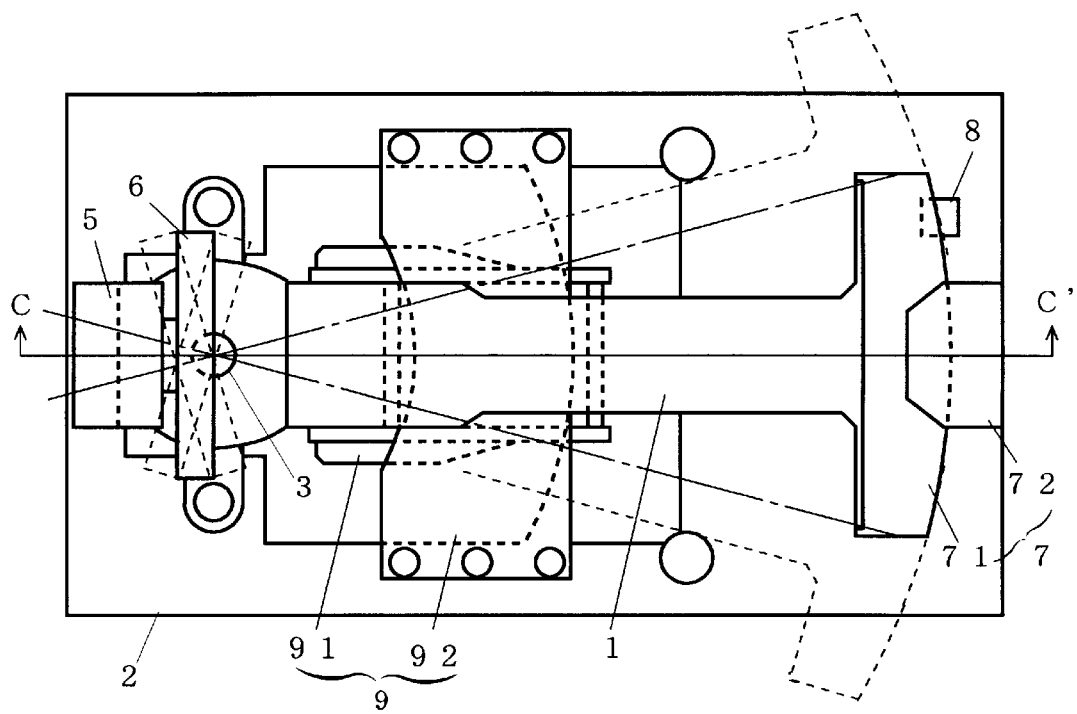
FIGS. 1A and 1B show the structure of a monochromator embodying the present invention, where
Figure 1B:
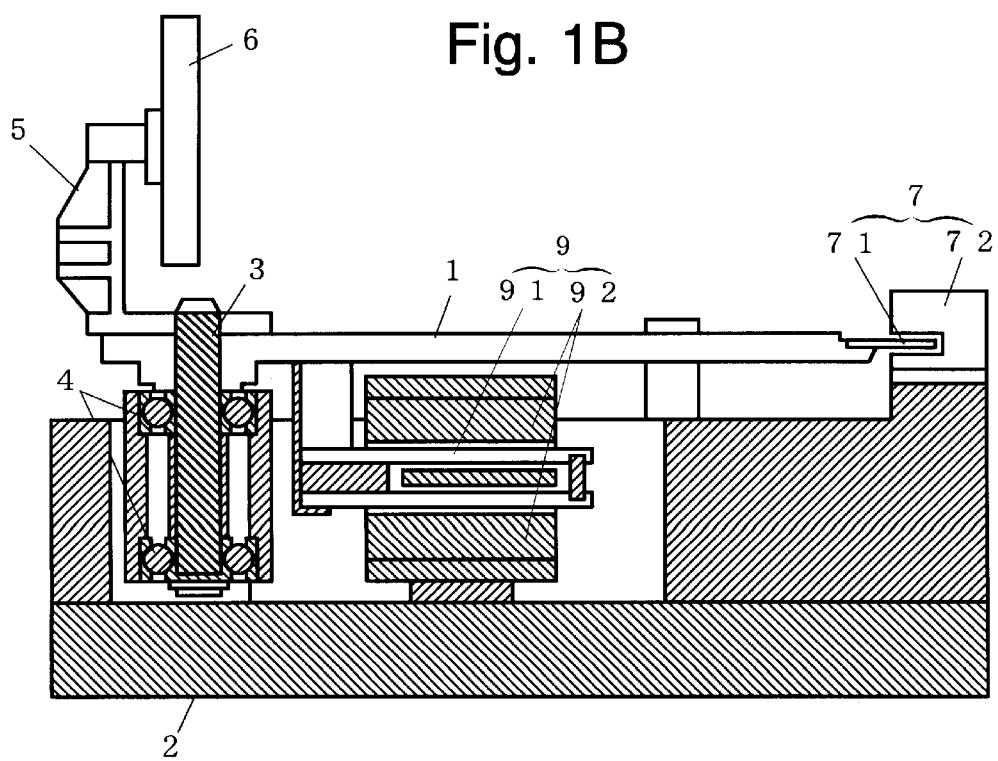

As shown in FIGS. 1A and 1B, the monochromator has a T-shaped horizontal arm 1. A vertical rotation shaft 3, which is supported by a pair of preload bearing units 4, is fixed at a near end of the stem part of the T-shaped arm 1. The outer rings of the bearing units 4 are fixed to a base 2, allowing the arm 1 to rotate on the axis of the rotation shaft 3 smoothly and firmly while keeping its horizontal position. A grating stand 5, on which a diffraction grating 6 is detachably mounted, is mounted at an extreme end of the stem part of the arm 1 near the rotation shaft 3. The diffraction grating 6 is posed coaxial to the rotation shaft 3, so that the orientation of the diffraction grating 6 with respect to an incident path changes according to the rotation of the arm 1, while maintaining the point where the incident light encounters the grating surface at the same position.

The other end of the arm 1, that is, the crossbar 71 of the arm 1, is thinly formed to pass through a groove of an encoder block 72 standing on the base 2. The crossbar 71 of the arm 1 and the encoder block 72 constitute a rotary encoder 7. The rotary encoder 7 may be of an optical type or a magnetic type. In an optical type rotary encoder 7, for example, slits are formed in the crossbar 71 at regular intervals, and a light emitting diode and a photo transistor are fixed to the encoder block 72 across the crossbar 71.

Figure 3:
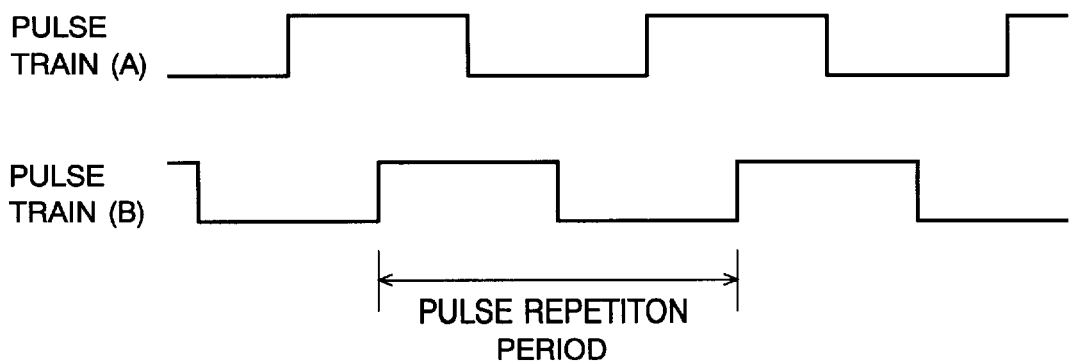
FIG. 3 shows waveforms of pulse trains generated by the rotary encoder of the monochromator.

As shown in FIG. 3, when the arm 1 rotates, the rotary encoder 7 generates two trains of pulse signals (A and B) having a phase difference. The amount of rotation of the arm 1 is calculated based on the number of pulses. Also, the rotating direction is detected as follows. When the arm 1 rotates counterclockwise in FIG. 1A, the rotary encoder 7 generates pulse trains A and B such that the rise of the pulse train A comes first and that of the pulse train B follows in every pulse-repetition period, as shown in FIG. 3. When, on the other hand, the arm 1 rotates clockwise in FIG. 1A, the rotary encoder 7 generates pulse trains A and B such that the rise of the pulse train B comes first and that of the pulse train A follows. Accordingly, the rotating direction of the arm 1 can be detected by analyzing the phase difference between the pulse trains A and B.

The angular resolution of the rotary encoder 7 is required to be smaller than the minimal angular movement ($\theta$) of the diffraction grating 6 that determines the minimal wavelength resolution of the monochromator. As for the optical type encoder described above, for example, the above requirement as to resolution is met by providing the slits at angular intervals smaller than the minimal angular movement $\theta$. As for the monochromator of the present embodiment, the angular interval of the slits can be determined adequately small, because the outermost end of the crossbar 71 is farther from the rotation shaft than a position where a linear motor 9, which will be described later, exerts a driving force to the arm 1.

Referring to FIG. 1A, an arm detector 8 for determining the origin of the rotary encoder 7 is provided near the rotary encoder 7. When the arm 1 is at a preset rotational position, the arm detector 8 detects the arm 1 and generates a detection signal. Based on this detection signal and the above-described pulse trains, the absolute rotational position of the arm 1 is calculated.

The linear motor 9, which is a modified voice-coil type having a moving part 91 and a stator part 92, is provided under the arm 1. An L-shaped member is fixed to the back of the arm 1 at a position between the rotation axis 3 and the crossbar 71, and the horizontal arm of the L-shaped member forms the moving part 91. The moving part 91 is inserted in a horizontal slot of the stator part 92 fixed to the base 2. The slot has an adequate length to allow the moving part 91 to move reciprocally over an angular range such that the orientation of the diffraction grating 6 can change as much as required for the entire wavelength scanning. Such a structure provides not only high responsiveness of the linear motor 9 to the driving voltage or driving current, but also a smooth and stable movement of the moving part 91 and the arm 1.

Figure 2:
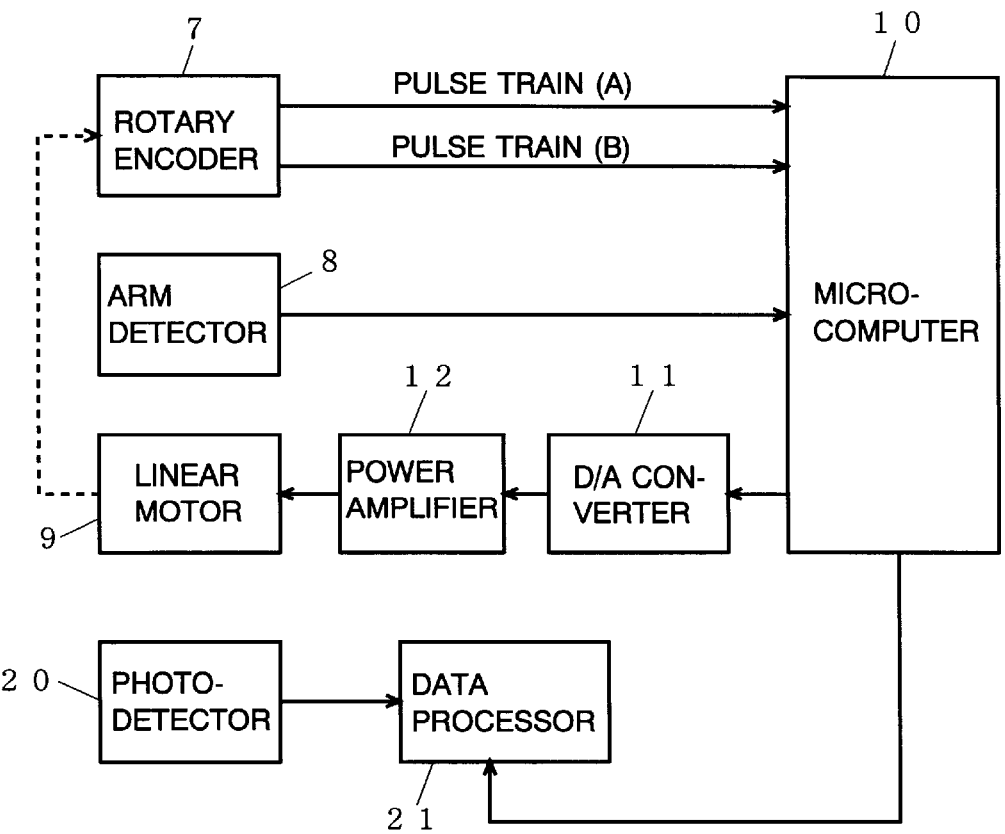
FIG. 2 is a block diagram showing the functional constitution of the monochromator.

During wavelength scanning, the monochromator operates as follows. Referring to FIG. 2, the two trains of pulse signals generated by the rotary encoder 7 and the output signal generated by the arm detector 8 are transmitted to a microcomputer 10 including a central control unit, a random access memory, a read-only memory and other elements (not shown in FIG. 2). The microcomputer 10 performs a calculation, which will be described later, according to a predetermined algorithm, and produces digital data (control data), which is the controlling input of the linear motor 9. The control data is converted to an analogue signal by a digital/analogue (D/A) converter 11, and the analogue signal is transmitted to the linear motor 9 after being amplified by a power amplifier 12. Thus being actuated, the linear motor 9 rotates the arm 1, and the rotary encoder 7 generates the two trains of pulse signals as described above. Receiving the pulse signals, the microcomputer 10 modifies the control data. The linear motor 9 is controlled by such a closed loop control.

Also, based on the output signals from the rotary encoder 7, the microcomputer 10 detects the rotational position of the arm 1, and generates a timing signal when the arm 1 reaches a preset rotational position, or once every preset angular interval. The timing signal can be utilized in an optical instrument in which the monochromator is employed. An example of such an instrument is a spectrophotometer constructed such that: a monochromatic light is extracted from diffracted light produced by the diffraction grating 6; the monochromatic light is irradiated to a sample; the monochromatic light, after being reflected by the sample or transmitted through the sample, is detected by a photodetector 20; and a data processor 21 samples output signals from the photodetector 20. In this spectrophotometer, the timing signal is utilized by the data processor 21 for determining a time point or time points at which the processor 21 samples output signals from the photodetector 20.

The wavelength scanning by the spectrophotometer is operated as follows. First, when two wavelength values λ1 and λ2 are determined as the minimum and maximum wavelengths defining a wavelength range to be scanned, the microcomputer 10 controls the linear motor 9 to bring the arm 1 to a rotational position (original position) where the arm detector 8 detects the arm 1 and generates a detection signal. This operation of bringing the arm 1 to the original position may be preferably performed at the beginning of every analysis. When the arm 1 is at the original position, the monochromatic light detected by the photodetector 20 has a known wavelength (λ0) determined by the type or structure (specified by the blaze angle, for example) of the diffraction grating 6, the position of the origin detector 8, etc. So, the microcomputer 10 determines the moving direction by comparing λ0 and λ1, and drives the linear motor 9 to move the arm 1 in that direction. Meanwhile, the microcomputer 10 counts pulse signals in the pulse train A or B generated by the rotary encoder 7 and determines whether the arm 1 is at a starting position corresponding to the wavelength λ1. When it is determined that the arm 1 is at the starting position, the microcomputer 10 stops driving the linear motor 9, ready to start the wavelength scanning.

During the wavelength scanning, the microcomputer 10 measures the pulse-repetition period of the pulse train (A or B) every time it receives a new pulse from the rotary encoder 7. Then, the microcomputer 10 calculates the difference between the calculated period and a preset reference period as a deviation index, and modifies the control data so that the deviation index is maintained at zero or a constant value. For example, when the speed of the arm 1 decreases, the actual pulse-repetition period of the pulse trains becomes longer and the deviation index becomes accordingly larger. In such a case, the microcomputer 10 modifies the control data so that the driving voltage supplied to the linear motor 9 increases, whereby the speed of the arm 1 increases. Thus, the microcomputer 10 regulates the driving voltage or driving current to control the linear motor 9 so that the arm 1 moves at a constant speed throughout the wavelength scanning.

Also, the microcomputer 10 determines the rotational position of the arm 1 at each time point based on the number of pulses transmitted from the rotary encoder 7, and calculates the wavelength corresponding to the rotational position based on the angular distance of the rotational position from the original position and the above-described original wavelength λ0. When the number of pulses counted as described above reaches a preset value corresponding to a preset wavelength interval, the microcomputer 10 sends a timing signal to the data processor 21, and restarts the counting of the pulses from zero. On receiving the timing signal, the data processor 21 samples the output signal of the photodetector 20 at the time point, produces measurement data representing the strength of the sampled output signal, and stores the data in its memory.

Rotating the arm 1 with the diffraction grating 6 fixed thereto, measurement data is obtained for each of the preset wavelengths one after another. When the arm 1 reaches a rotational position corresponding to the maximum wavelength λ2, the microcomputer 10 stops driving the linear motor 9.

It should be noted that the above-described embodiment is a mere example and not restrictive, and the present invention can be embodied in various ways within the spirit and scope thereof.

For example, it is assumed in the embodiment that the wavelengths are scanned from the minimum wavelength λ1 to the maximum wavelength λ2. It is of course possible that the wavelengths are scanned from the maximum wavelength 2 to the minimum wavelength λ1. Also, the wavelengths may be scanned in both directions continuously. That is, for example, the wavelengths are first scanned from the minimum to the maximum wavelength, and when the arm 1 reaches the rotational position corresponding to the maximum wavelength, the microcomputer 10 reverses the polarity of the driving voltage supplied to the linear motor 9. After that, the wavelengths are scanned backwards.

Also, the deviation index may be calculated based on the phase difference between the two trains of pulse signals from the rotary encoder 7. For example, the difference between the value of the above-mentioned phase difference and a predetermined reference value is available as the deviation index.

What is claimed is:

1. A monochromator for producing a monochromatic light, comprising:
    a rotor rotatable on a rotation axis;
    a light-dispersing element fixed to the rotor, the central axis of the light-dispersing element being substantially coincident with the rotation axis;
    a linear motor having a moving part fixed to the rotor at a position displaced from the rotation axis and a stator part operative with the moving part to rotate the rotor around the rotation axis within a preset angular range;
    a position detector for detecting the rotational position of the rotor within the preset angular range; and
    a controller for controlling the linear motor based on the output signal of the position detector.

2. The monochromator according to claim 1, wherein the position detector generates two trains of pulse signals having a phase difference.

3. The monochromator according to claim 1, wherein the linear motor is a modified voice-coil linear motor constructed so that the moving part moves reciprocally within the preset angular range along an arc.

4. The monochromator according to claim 2, wherein the linear motor is a modified voice-coil linear motor constructed so that the moving part moves reciprocally within the preset angular range along an arc.

5. The monochromator according to claim 1, wherein the position detector is a rotary encoder fixed at a position farther from the rotation axis than the linear motor.

6. The monochromator according to claim 1, wherein the light-dispersing element is a detachable diffraction grating attached to the rotor so that a central axis of the diffraction grating substantially coincides with the rotation axis.

7. The monochromator according to claim 1, wherein the rotary encoder is of an optical type.

8. An optical analyzing device, comprising:
    a monochromator according to claim 1;
    a light source for generating polychromatic light;
    a photodetector for detecting monochromatic light produced by the monochromator;
    a sample holder placed either between the light source and the monochromator or between the monochromator and the photodetector; and
    a data processor for sampling a detection signal from the photodetector.

9. An optical analyzing device, comprising:
    a monochromator according to claim 2;

a light source for generating polychromatic light;

a photodetector for detecting monochromatic light produced by the monochromator;

a sample holder placed either between the light source and the monochromator or between the monochromator and the photodetector; and a data processor for sampling a detection signal from the photodetector.

10. The optical analyzing device according to claim 8, wherein:

the controller of the monochromator generates a timing signal based on the output signal of the position detector; and the data processor samples the detection signal from the photodetector at a time point determined based on the timing signal.

11. The optical analyzing device according to claim 9, wherein:

the controller of the monochromator generates a timing signal based on the output signal of the position detector; and the data processor samples the detection signal from the photodetector at a time point determined based on the timing signal.

* * * * *